United States Patent [19]

Omoda et al.

[11] Patent Number: 5,010,477
[45] Date of Patent: Apr. 23, 1991

[54] METHOD AND APPARATUS FOR TRANSFERRING VECTOR DATA BETWEEN PARALLEL PROCESSING SYSTEM WITH REGISTERS & LOGIC FOR INTER-PROCESSOR DATA COMMUNICATION INDEPENDENTS OF PROCESSING OPERATIONS

[75] Inventors: Koichiro Omoda, Sagamihara; Teruo Tanaka, Hachioji; Junji Nakagoshi; Naoki Hamanaka, both of Tokyo; Shigeo Nagashima, Hachioji, all of Japan

[73] Assignee: Hitachi, Ltd., Tokyo, Japan

[21] Appl. No.: 109,293

[22] Filed: Oct. 15, 1987

[30] Foreign Application Priority Data

Oct. 17, 1986 [JP] Japan .................... 61-245241
Oct. 29, 1986 [JP] Japan .................... 61-255663

[51] Int. Cl.⁵ ............ G06F 7/02; G06F 15/347; G06F 15/16; G06F 9/38
[52] U.S. Cl. ............ 364/200; 364/931.41; 364/931.51; 364/935.2; 364/937.7; 364/942.6; 364/933; 364/229.2; 364/230.5; 364/232.21; 364/247; 364/260
[58] Field of Search ... 364/200 MS File, 900 MS File

[56] References Cited

U.S. PATENT DOCUMENTS

| 4,400,771 | 8/1983 | Suzuki et al. | 364/200 |
|---|---|---|---|
| 4,439,826 | 3/1984 | Lawernce et al. | 364/200 |
| 4,450,572 | 5/1984 | Stewart et al. | 360/44 |
| 4,494,185 | 1/1985 | Gunderson et al. | 364/200 |
| 4,498,133 | 2/1985 | Bolton et al. | 364/200 |
| 4,591,971 | 5/1986 | Darlington et al. | 364/200 |
| 4,636,942 | 1/1987 | Chen et al. | 364/200 |
| 4,720,784 | 1/1988 | Radhakrishnan et al. | 364/200 |
| 4,777,595 | 10/1988 | Strecker et al. | 364/200 |
| 4,803,620 | 2/1989 | Inagami et al. | 364/200 |

OTHER PUBLICATIONS

"A Super-Computer Having Transputer Coupled in a Hypercube Fashion", *NIKKEI BYTE*, Nikkei Business Publications, Inc., Jun. 1986, pp. 68-72, An English translation of this document is enclosed.

*Primary Examiner*—Archie E. Williams, Jr.
*Assistant Examiner*—Ayni Mohamed
*Attorney, Agent, or Firm*—Fay, Sharpe, Beall, Fagan, Minnich & McKee

[57] ABSTRACT

A parallel processor system having a plurality of processor elements includes transfer information generation circuit for generating transfer information by adding to vector data a data identifier for the vector data and a destination processor element number, transmission circuit for sending the transfer information to a data communication path, receive circuit for holding the transfer information sent from the data communication path, and vector register for continuously reading related element data from the receive circuit based on the data identifiers generated by the transfer information generation circuit.

12 Claims, 11 Drawing Sheets

FIG. 11 VECTOR DATA TRANSFER

METHOD AND APPARATUS FOR TRANSFERRING VECTOR DATA BETWEEN PARALLEL PROCESSING SYSTEM WITH REGISTERS & LOGIC FOR INTER-PROCESSOR DATA COMMUNICATION INDEPENDENTS OF PROCESSING OPERATIONS

CROSS-REFERENCE TO OTHER APPLICATIONS

The present invention relates to U.S. patent application Ser. No. 07/008,656 filed Jul. 28, 1987, assigned to the assignee of the present invention and claiming priority of a patent application filed in Japan on Aug. 1, 1986 and invented by inventors including the inventors of the present invention.

BACKGROUND OF THE INVENTION

The present invention relates to a multi-processor system, and more particularly to a system for transferring vector data between the processors of a parallel processing system.

In a parallel processing system, efficient communication between the processors is an important consideration especially when a plurality of processors must process vectors. It is therefor necessary to transfer the large amount of data between the processors efficiently.

U.S. Pat. No. 4,636,942 discloses a communication control circuit to monitor and control the data transfer between tightly coupled processors through a common register and a central or main memory using a semaphore register.

The semaphore register protects a common data resource from being simultaneously accessed by the tightly coupled processors of the system. The semaphore register also contains high speed hardware for software communication between the processors. Common parameters, such as scalar data, are transferred between the processors through the common register, and vector data is transferred through the central or main memory.

In the vector data transfer between the processors, the vector data is transferred through the central or main memory exclusively. In a parallel processing system, access to the central or main memory becomes concentrated as the number processes in the system increases. In some cases, the central memory cannot grant all access requests from the individual processors and therefor some processors must wait to be serviced. The processors thus denied access to the central memory are placed in a wait state and remain idle until their access requests are honored. When processors are made to wait for access to the central memory for the transfer of vector data, the system throughput is reduced because of increases in transfer overhead greatly reducing the overall performance of the parallel processing system.

OBJECTS OF THE INVENTION

It is an object of the present invention to provide a high speed system for transferring vector data between the parallel processors of a parallel processing system.

Another object of the present invention is to provide a method and system for transferring data between two processors designated by a program, through a network.

It is another object of the present invention to provide a transfer means independent from the order of transfer of elements of vector data between processors.

It is a further object of the present invention to sequentially store the results of vector data operations in a vector register and simultaneously write the stored results to another processor, that is, to chain the vector data between the processors whereby a vector result becomes the operand for a succeeding functional operation.

It is another object of the present invention to directly transfer vector data between processors of a parallel processing system independent of processing, so that a high speed vector data transfer between the processors is attained and the overall performance of the parallel processing system is thereby improved.

SUMMARY OF THE INVENTION

The above objects are achieved by a multiprocessor system having processors connected in parallel. Transfer information is generated comprising vector data having a data identifier and a destination processor element number (PE) added thereto. The transfer information is transmitted to a data communication path where it may be sent to and held by, a receiving circuit. A vector register continuously reads a designated data element within the receiving circuit based upon the data identifier generated by the sending circuit.

The data communication path functions to send a data packet to a destination processor using the transfer information appended to the data packet.

The data packet comprises a receiving processor number, a vector register number, the transmitting processor number of the processor which sent the data packet, and the vector data to be transferred.

Each processor has a plurality of vector registers for storing the vector data and can perform vector processing upon an instruction from a host processor. Each processor has a flag (valid flag) to indicate whether the content of the vector register can be overwritten (unused) or not (valid).

A register for holding the transmitting processor number when vector data is sent is provided in the receiving circuit of each processor. The register is inspected to determine whether the data packet sent from the data communication path is to be processed by that processor or not.

When the vector data stored in the vector register is to be transferred to another processor for additional processing, first the vector data is read and then the transfer information having the destination processor number (PE) for each data unit and the data identifier for identifying the data added thereto is generated. The transfer information is sequentially transmitted to the receiving circuit through the data communication path. When the data communication path is a multistage switching network, various transfer routes may be included and there is no assurance that the data will arrive at the destination processor in the same order of transmission, depending upon the activity of the route. In the present invention, since each data unit has an identifier, the data unit can be reconfigured into vector data of the correct order in the destination processor. The destination processor can temporarily hold the transfer information in an associative memory means.

The vector data transferred from another processor may be read into the vector register of any processor in the multi-processor system. Initially, when the vector data to be transferred is to be accessed, the data identifiers (one for each data element to be read) are sequentially generated by the transfer information generation means, then, at the receiving processor, related data is read from the associative memory means by the associative memory access means based on the data identifiers and they are stored in the vector registers. In this manner, the direct transfer and asynchronous transfer of the vector data between the processors and the transfer of the vector data independent of the order of transfer of the data elements is attained.

When a vector data is to be transferred from a first processor to a second processor, the data transmitter of the first processor collects information necessary for a data packet and sends it to the data communication path.

The data packet thus sent over the data communication path is received by the data receivers of all the other processors in the system. Each data receiver compares the destination processor element number to determine whether the data packet was sent to it particularly. If the destination processor element number matches the preassigned processor number, it is determined that the data packet was sent to that particular processor.

The data receiver reads the valid flag and the processor flag corresponding to the vector register number of the processor receiving the data packet.

When both the content of the valid flag is "0" indicating the presence of unused data, and when the content of the receiving processor number matches the destination processor number within the data packet, the vector data is written into the vector register corresponding to the destination vector register number of the data packet. The content of the valid flag is then set to "1".

When data is to be written into the vector register in the processor, it can be written irrespective of the I/O state of the valid flag means when data is to be read, it can be read when the content of the valid flag is "1", but the reading of the vector register is suspended when the content is "0".

By using the data communication path and providing the valid flag means and the receiving processor number hold means in each processor, the order of the vector data transfer is assured and the vector data can be transferred at a high speed among a number of processors.

DESCRIPTION OF THE PREFERRED EMBODIMENTS

Figure 1:
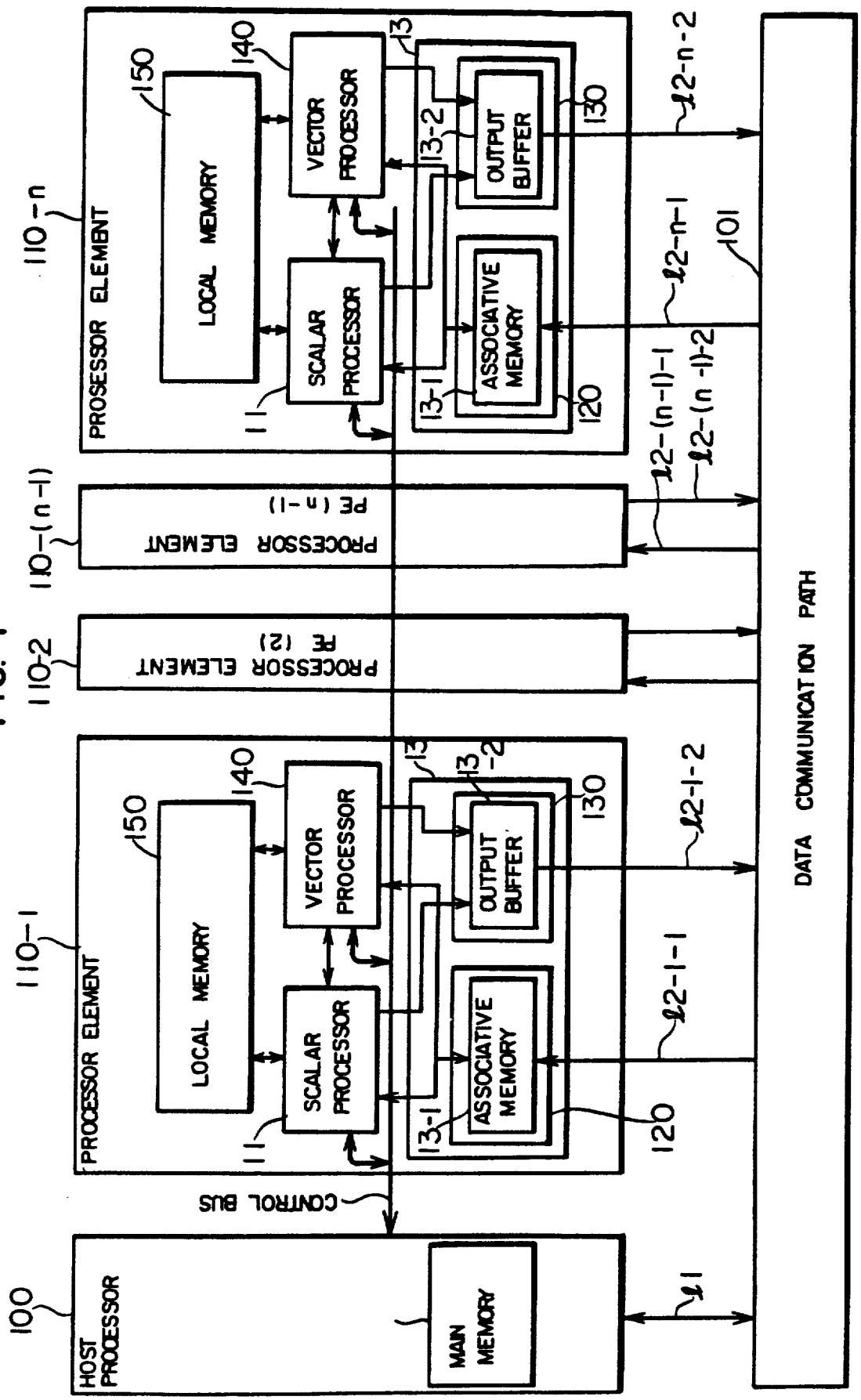
FIG. 1 shows a schematic diagram of one embodiment of the present invention.

A schematic configuration of one embodiment of the present invention is shown in FIG. 1. A host processor 100 controls all processor elements (PE), 110-1 to 110-n. All processor elements (PE) which are identical to each other in the present invention comprising a local memory 150, a scalar processor 11 for performing a scalar operation, an associative memory 13-1 to store data and corresponding data identifier to store data and corresponding data identifier pairs and can retrieve data based on the data identifiers. An output buffer 13-2 is provided which buffers a data packet comprising a destination processor number PE, and identifier and data. The output buffer then sends the data packet out to a network 101 through which the packet is sent to the destination processor designated by the PE number in the packet. Signal line 12-1-1 to 12-n-1, and 12-1-2 to 12-n-2 are connected to the network for control and data transfer purposes.

The data communication path 101 may be a multi-stage network such as cross-bar switch, a hypercube network or a generic common bus network.

When the operation results of the scalar processor 11 or the vector processor 140 of a PE is required by another PE, the data is formed into a packet having the destination processor number PE and the identifier added thereto. It is then transferred to the designated PE through the output buffer 13-2 and the network 101. When a PE receives the transferred packet, it stores the identifier and the data into the associative memory 13-1. Then, the scalar processor 11 and the vector processor 140 send the identifier to the associative memory 13-1 to read the related data. If the related data is not found in the associative memory 13-1, it is necessary to suspend the process, or the process may switched to other one.

Figure 2:
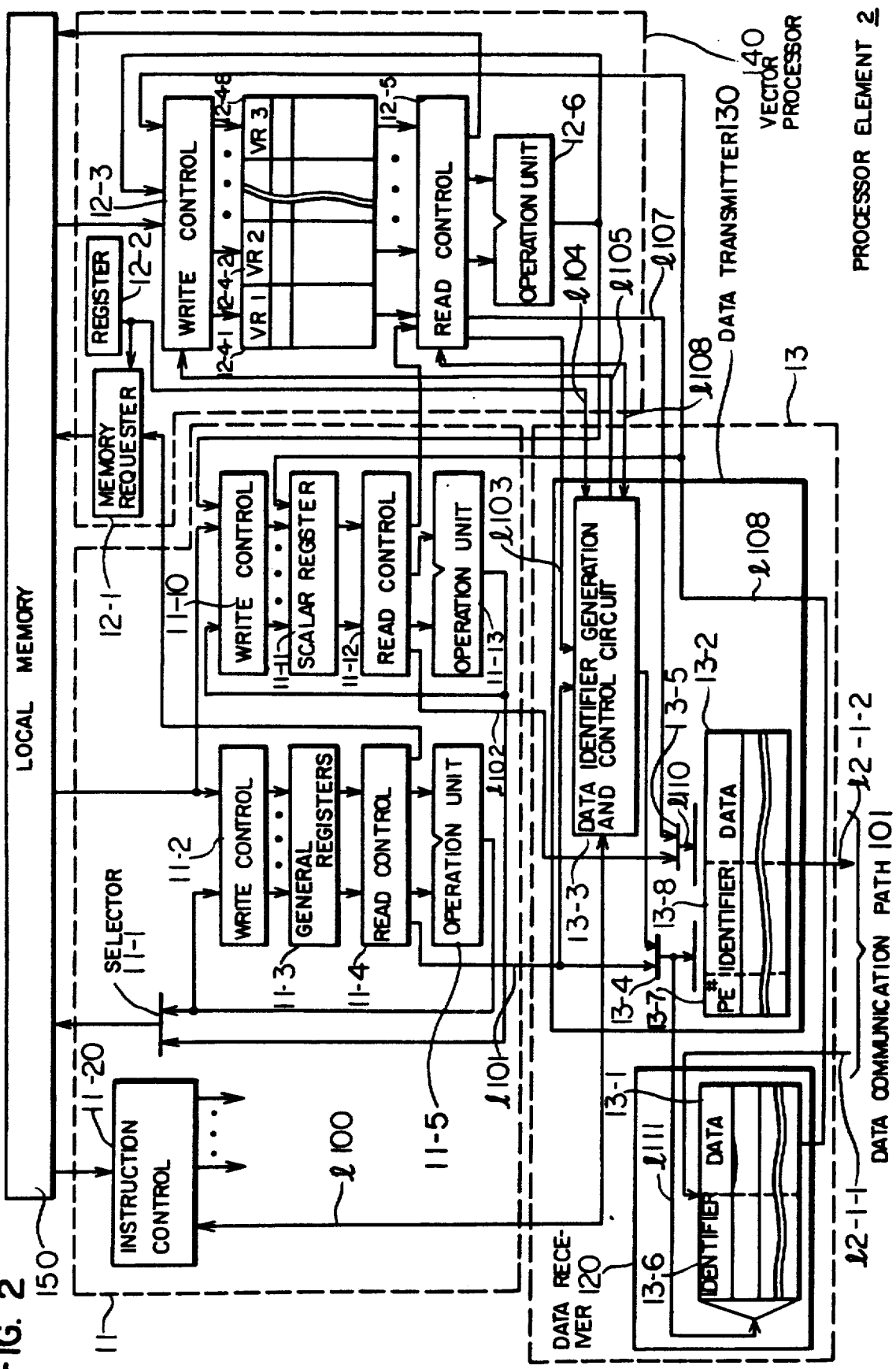
FIG. 2 shows a configuration of a processor element in the embodiment of FIG. 1.

FIG. 2 shows the configuration of each processor element in the embodiment of FIG. 1. An instruction control 11-20 fetches an instruction sequence from a local memory 150, decodes it and controls instruction execution. Each processor element includes a selector 11-1, write controls 11-2 and 11-10, a general purpose register stack 11-3 comprising a plurality of registers, a scalar register stack 11-11 comprising a plurality of registers, read controls 11-4 and 11-12, operation units 11-5 and 11-13, a memory requester 12-1 which sends a read/write request to the local memory 150 or generates and sends an address when vector data is to be read or written from or to the local memory 150. An element count register 12-2 is provided which stores the number of elements of the vector data to be processed, along with a write control 12-3, vector registers 12-4-1 to 12-4-8, a read control 12-5, an operation unit 12-6, a data identifier generation and control circuit 13-3 (hereinafter simply referred to as control circuit), selectors 13-4 and 13-5, and signal lines 1100 to 1111. (Those elements which are duplicate of the embodiment of FIG. 1 are not explained here.)

Generally, vector processing deals with the processing of ordered arrays of data relying upon the hardware of the processing system to achieve a higher speed of operation. In the present invention, vector data is sequentially read from the local memory 150 and written into the vector registers 12-4-1 to 12-4-8 through the write control 12-3 under the control of the read control 11-4 and the memory requester 12-1. The vector data thus written into the vector registers is sequentially sent to a pipeline operation unit 12-6 through the read control 12-5, and the operation results are sequentially stored into the vector registers. The vector data of the operation results stored in the vector registers are written into the local memory 150 through the read control 12-5 under the control of the memory requester 12-1.

In the vector processing of the present invention, the vector data is read from the local memory and written into the vector registers. When the vector data is transferred from another PE into the vector registers through the associative memory 13-1, the results of the prior operation may be stored in the local memory, or may be transferred to the another PE through the output buffer.

Figure 3:
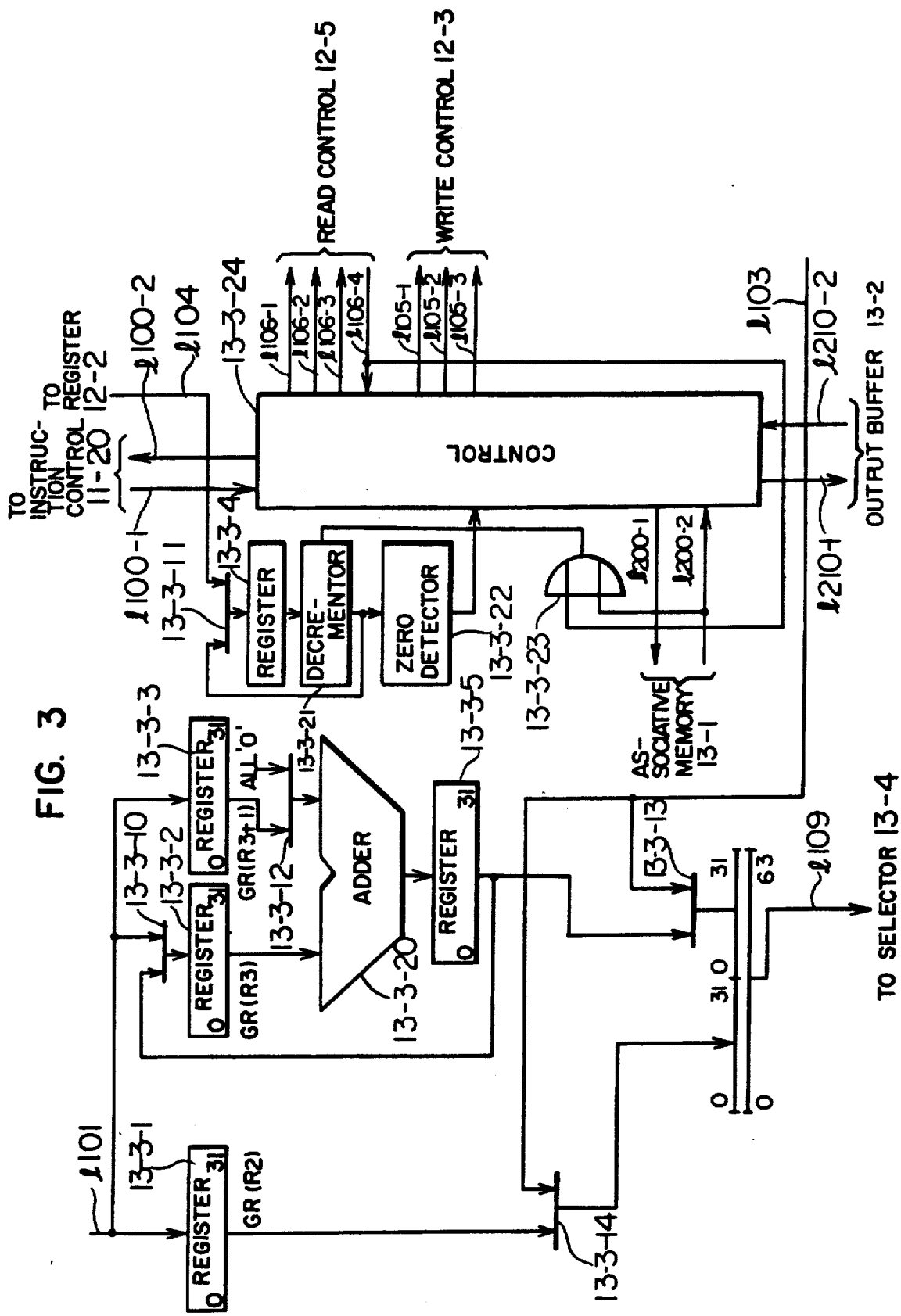
FIG. 3 shows an embodiment of a data identifier generation and control circuit which is a feature of the present invention.

A detailed configuration of the data identifier generation and control circuit 13-3 of FIG. 2 is shown in FIG. 3.

The data identifier generation and control circuit comprises registers 13-3-1 to 13-3-5, selectors 13-3-10 to 13-3-14, an adder 13-3-20, a decrement circuit 13-3-21, a zero detector 13-3-22, an OR circuit 13-3-23, a control circuit 13-3-24, and signal lines 1100-1 to 1100-2, 1106-1 to 1106-4, 1105-1 to 1105-3, and 1210-1 to 1210-2.

The process of reading the vector data from the vector registers, forming it into a packet and sequentially writing it into the output buffer 13-2 (vector send process) will be explained first. The format of the packet and the format of an instruction for the vector send process are later explained with reference to FIG. 5 and 4, respectively.

Figure 5:
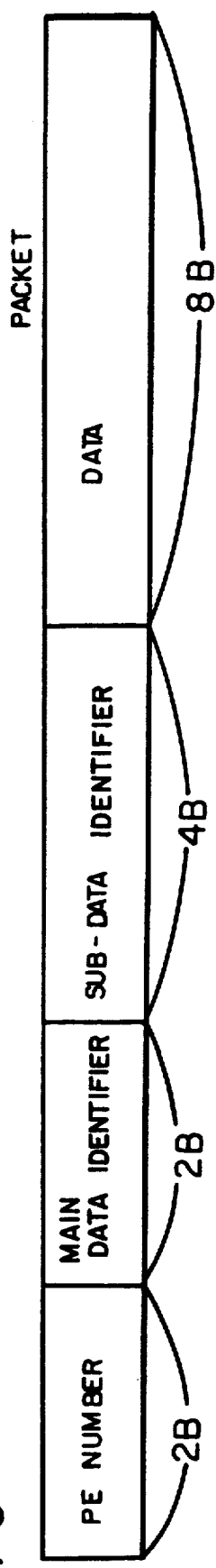
FIG. 5 shows a format of a transfer packet when data is transferred between processors through a network.

As shown in FIG. 5, the packet comprises a two-byte PE number field for designating a destination PE number, a two-byte main data identifier filed, a four-byte sub-data identifier field and an eight-byte data field. The length of each field may be arbitrary and another field, such as a control information field, may be added. High speed transfer can be attained by the use of the main identifier which allows for a course data identification rather than using all six bytes for the precise data identification.

Figure 4:
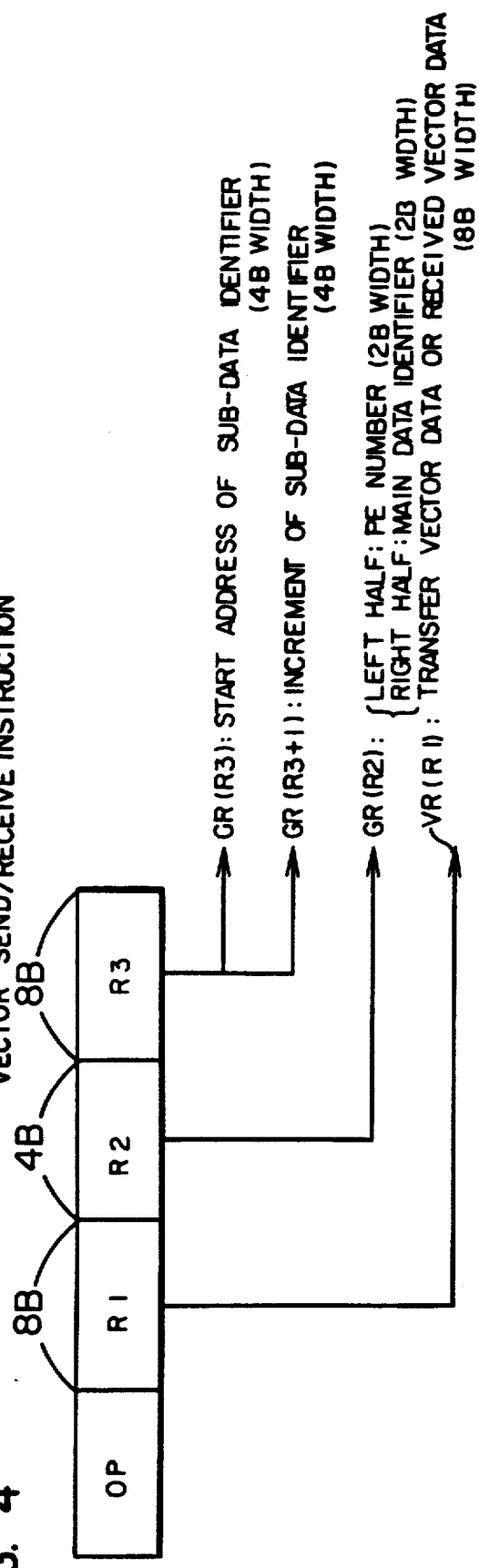
FIG. 4 shows an instruction format of a vector send-/receive instruction.

As shown in FIG. 4, the vector send instruction comprises an OP field which contains an operation code, and R1, R2 and R3 fields. The R1 field designates a vector register number in which the vector data to be transferred is stored. The R2 field designates one of the general purpose registers. The two left bytes of the designated general purpose register contain the destination PE number and the two right bytes contain the main data identifier. The R3 field designates the general purpose register by an odd/even pair (R3 even, R3+1 odd), and the even number general purpose register designates a start address of the sub-data identifier (in four bytes) and the odd-number general purpose register designates an increment of the sub-data identifier (in four bytes).

The sub-data identifier is generated based upon the start address and the increment of the sub-data identifier in the following manner.

Sub-data identifier of first vector element
= start address
Sub-data identifier of second vector element
= start address + increment
Sub-data identifier of third vector element
= start address + (increment × 2)

.
.
.

Sub-data identifier of n-th vector element
= start address + (increment × (n-1))

In the present invention, the start address and the increment of the sub-data identifier are designated by the instruction so that they may take any value. Alternatively, they may be fixed for simplification such as zero for the start address and 1 for the increment.

When the start address and the increment can be set arbitrarily, one-dimension or two-dimension data may be partially accessed while maintaining consistency by regularly assigning the identifiers to the data in the same manner as the memory addressing.

In the present invention, the main data identifier and the sub-data identifier are separated. However, they may be mixed and controlled together.

The vector send process is carried out in the following manner with reference to FIG. 3. When the instruction control 11-20 decodes the vector send instruction, it sends the start signal and instruction field information to the control circuit 13-3-24 through the signal line 1100-1, then writes the content of the general purpose register, designated by the field R2, into the register 13-3-1, through the signal line 1101. Next, the instruction control 11-20 writes the content of the even-number general purpose register, designated by the field R3 into the register 13-3-2 through the selector 13-3-10, Writes the content of the odd-number general purpose register into the register 13-3-3, and writes the element count from the register 12-2 into the register 13-3-4 through the signal line 1104 and the selector 13-3-11. Then, the control circuit 13-3-24 sends the vector register number of the vector register to be read (the R1 field of the instruction) through the signal line 1106-1, sets the read start request through the signal line 1106-2 and sends it to the read control 12-5. In response to the read start request, a data receive signal is transferred from the read control 12-5 to the control circuit 13-3-24 via signal line 1106-4. The vector data is sequentially written into the output buffer through the signal line 1107 and the selector 13-5 in synchronism with the data receive signal as shown in FIG. 2. Simultaneously, the PE numbers corresponding to the elements of the vector data, main data identifiers, and sub-data identifiers are sequentially written into the output buffer from the registers 13-3-1 and 13-3-5 through the signal line 1109 and the selector 13-4. The sub-data identifier is generated by the addition in the adder 13-3-20 based on the start address and the increment stored in the registers 13-3-2 and 13-3-3.

The data receive signal sequentially transferred through the signal line 1106-4 is applied to the decrement circuit 13-3-21 through the OR circuit 13-3-23 and is used as an enable signal to decrement the element therein by one. In response to the data receive signal, the control circuit 13-3-24 sends a write signal to the output buffer 13-2 through the signal line 1210-1.

When the element count reaches zero as it is sequentially decrement, the zero detector 13-3-22 sends a zero detect signal to the control circuit 13-3-24. In response to the zero detection signal, the control circuit 13-3-24 sends an end signal to the instruction control 11-20 through the signal line 1100-2.

If the output buffer 13-2 has a sufficient vacant area, the data can be continuously written therein, but if the vacant area is smaller than a predetermined limit, the output buffer 13-2 sends a busy signal to the control circuit 13-3-24 through the signal line 1210-2. In response to the busy signal, the control circuit 13-3-24 sends a signal to suspend the read of the vector register to the read control 12-5 through the signal line 1106-3 to interrupt the read of the vector data until the release of the busy signal. As an alternative to the interrupt function, the process may be switched to another register.

The process of designating a data identifier, retrieving the corresponding vector data from the associative memory and writing it into a vector register (vector receive process) is explained below in detail. A packet, transferred through the network 101 first has its PE number deleted and then is stored in the associative memory 13-1. The format of the vector receive instruction is shown in FIG. 4.

Referring to FIG. 3, when the instruction control 11-20 decodes the vector receive instruction, it sends the start signal and the instruction fields to the control circuit 13-3-24 through the signal line 1100-1. Then it writes them into the registers 13-3-1, 13-3-2, and 13-3-3 as in the vector send process.

The control circuit 13-3-24 then sends the vector register number to the write control 12-3 through the signal line 1105-1. Then, it sends a retrieval request signal to the associative memory 13-1 through the signal line 1200-1, and sends the main/sub-data identifiers to the associative memory 13-1 through the selector 13-4 and the signal line 1111 in synchronism with the sending of the retrieve request. The sub-data identifier is generated in the same manner as in the vector send process described above. Responsive to the retrieve request signal, the associative memory 13-1 retrieves the data based on the data identifier synchronously transferred. If related data is retrieved by the retrieval entry or keys, the associative memory sends a match signal to the control circuit 13-3-24 through the signal line 1200-2 and transfers the related data to the write control 12-3 through the signal line 1108 in synchronism with the match signal and writes it into the designated vector register. In response to the match signal, the control circuit 13-3-24 sends a write enable signal to the write control 12-3 via signal line 1105-2 to request the writing of the data.

The match signal is also applied to the decrement circuit 13-3-21 through the OR circuit 13-3-23 and is used as an enable signal to decrement the element count by one. When the element count reaches zero as it is sequentially decremented, a zero detect signal is sent from the zero detector 13-3-22 to the control circuit 13-3-24. In response to the zero detect signal, the control circuit 13-3-24 sends an end signal to both the instruction control 11-20 through the signal line 1100, and to the write control 12-3 through the signal line 1105-3 to terminate the process.

Figure 6:
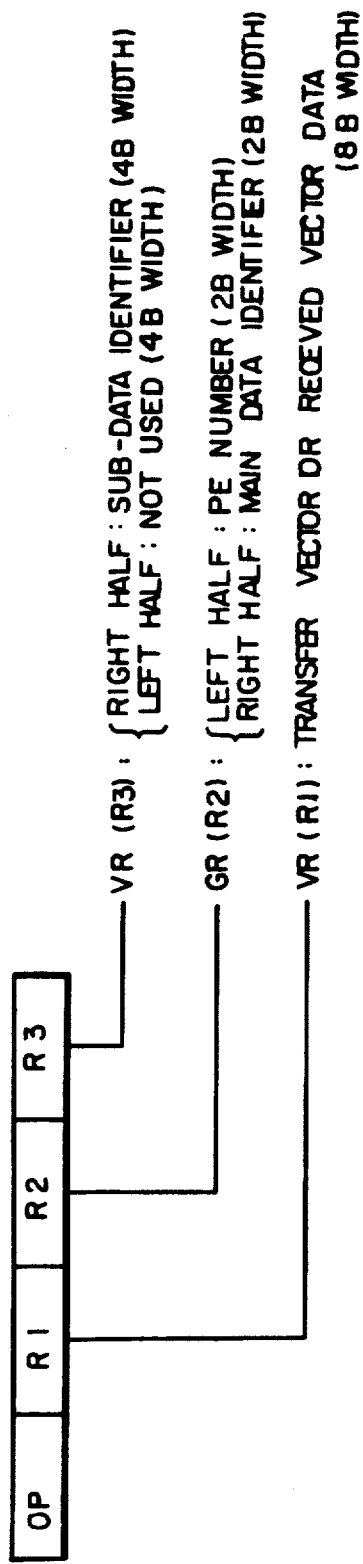
FIG. 6 shows a second instruction format of a vector send/receive instruction.

FIG. 6 shows a second format of the vector send/receive instruction.

In the first format shown in FIG. 4, the sub-data identifiers are regularly generated in the ascending order of the vector element numbers. In the second format of FIG. 6, the sub-data identifier is randomly assigned for each vector element. To this end, the R3 field of the instruction designates the vector register, and right four bytes of the designated vector register correspond to the sub-data identifier of each element.

The process utilizing the second instruction format is basically identical to that of the first format except for the following. In the second format, the setting of the registers 13-3-2 and 13-3-3 and the operation of the sub-data identifier based on the contents of those registers are not necessary. Instead, the vector register number stored in the R3 field is transferred to the read control 12-5 through the read control 11-12, and the four right bytes of the data, read from the corresponding vector register through the signal line 1103, are sent to the signal line 1109 as the sub-data identifier through the selector 13-3-13.

Figure 7:
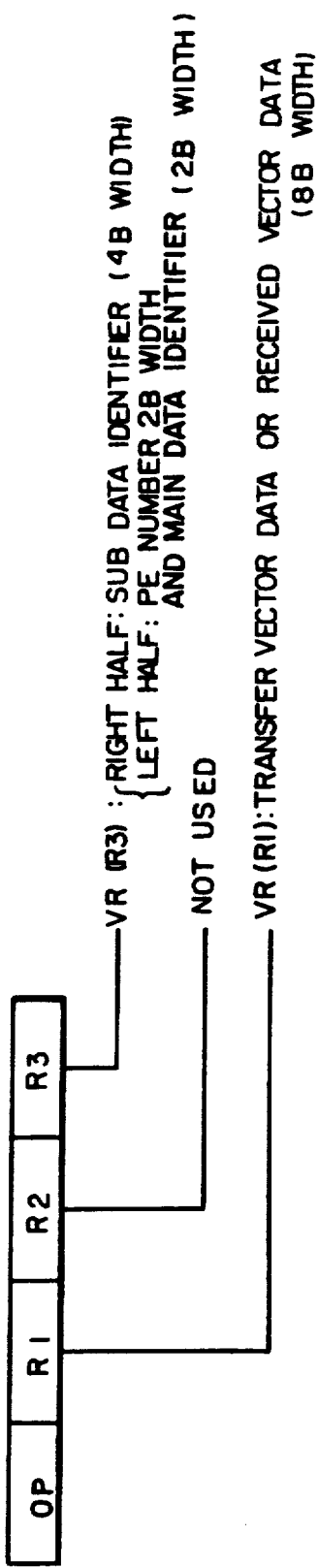
FIG. 7 shows a third instruction format of a vector send/receive instruction.

A third format of the vector send/receive instruction is shown in FIG. 7.

In the second format of FIG. 6, only the sub-data identifier is random for each vector element. In the third vector send/receive format, the PE number and the main data identifier may also be random.

The left four bytes of the vector register designated by the R3 field of the third format correspond to the PE number and the main data identifier of each element. The left four bytes of the read data transferred from the read control 12-5 through the signal line 1109 are sent as the PE number and the main data identifier to the signal line 1109 through the selector 13-3-14. In FIG. 7, the R2 field is not used although it may be used to designate the vector register number of the vector register in which the PE number and the main data identifier are stored.

The send/receive process for scalar operation is now explained for the present embodiment. Scalar operations are accomplished using the format of FIG. 4 by designating a scalar register number by the R1 field and designating a general purpose register which stores only the sub-data identifier by the R3 field.

Instead of designating the PE number and the data identifier by the general purpose register, they may be stored in the local memory and the appropriate address may be designated by the instruction. If an address register stack, which is used to designate an address in the local memory when the vector data is read from the local memory to the vector register, or written from the vector register to the local memory, is implemented in vector processing, the address register stack may be used for scalar processing as well.

The data identifier generation and control circuit 13-3 and the memory requester 12-1 of the present invention are functionally similar to each other. For example, an address adder in the memory requester 12-1 and the adder 13-3-20 of the present embodiment perform the same function. Common elements of those circuits may be identical.

Another embodiment of the present invention is now explained with reference to FIG. 8 which shows an overall configuration of a parallel processor having a data communication path 101 through which data is transferred between processors. The data communication path functions to send a data packet 102 to a desired processor by using transfer information contained in the data packet. The data communication path 101 may be a cross-bar switch, a multi-stage switching network or a common bus. Numerals 110–112 denote processors. Only three processors are shown.

Each of the processors 110 to 112 comprise a data receiver 120, a data transmitter 130, a data processor 140 and a local memory 150.

The data processor 140 performs vector and other operations and comprises a plurality of vector registers (VR) 141, a pipeline operation unit 144, an instruction control 146 and a VR read/write control 145. The VR 141 has a valid flag 142 to indicate whether the content held in the VR is valid or not and a register (RVPE) 143 which holds the receiving processor number for the vector data to be supplied from another processor.

In this embodiment, both the new instructions, for which the flag 142 is set to "0", and the receiving processor number written to the RVPE 143 are added for use in the synchronous control for the reception of vector data from another processor.

The instruction control 146 fetches the instruction from the local memory 150, decodes it and controls the execution thereof.

The VR read/write control 145 controls the read/write of the VR 141. Control is based on the valid flag 142 corresponding to the VR 141. When the processor 110 is to write the data in the VR 141, it can write irrespective of logical state of the valid flag 142. The processor can only read data when the valid flag 142 is "1". When the valid flag 142 is "0", the read of the VR 141 is suspended until the valid flag 142 becomes "1" through use of the data in the VR. When the data is to be written from another processor to the VR 141 thereof, it is controlled by an enable signal 147 of the data receiver 120.

When the valid flag of the VR is "0" and the data is to be written into that VR by its own processor, the valid flag becomes "1" upon writing and subsequent writing into that VR from another processor is not permitted. This may occur because of a software bug and does not normally occur.

The data transmitter 130 generates a data packet 102 or 107 to be sent to the data communication path 101 and comprises a transmission control 131 containing a microprocessor device.

When the data processor 140 starts the data transmitter 130 in order to send the data packet 102 to the data communication path 101, the data transmitter 130 receives the data necessary to generate the data packet from the data receiver 120 and the data processor 140.

The data packet 102 comprises a processor number (PERN) 102 to identify the processor to receive the vector data, a vector register number (VRRN) 104, a processor number (PESN) 105 to identify the transmitting processor and the vector data 106 to be transferred.

The data packet 107 comprises a processor number (PERN) 108 to identify the processor to receive the vector data and a condition code (CC) 109.

The data receiver 120 receives the data packets 102 and 107 sent from the data transmission path 101 and determines whether it should receive the data packet 102 or 107. For the data packet 102, the data receiver 120 holds the PERN 103, VRRN 104, and PESN 105 of the data packet 102 in registers 121-123, respectively. The comparator 125 compares the PERN 121 with the local processor number PEN 124 assigned to the processor. If they do not match, the processor does nothing. If they match, the data receiver 120 reads the valid flag 142 and the RVPE 143 added to the VR 141 designated by the VRRN 122. The comparator 126 checks if the valid flag 142 is "0", and if the RVPE 143 and the PESN 123 are equal. If they are equal, an enable signal 147 is sent to the data processor 140 and instructs the VR 141 corresponding to the VRRN 122, to write data into the vector data 106. The receive control 127 of the receiving processor generates a condition code to inform the transmitting processor that the transferred vector data has been correctly read, combines it with the PESN 123 and requests the transmission control 131 to generate an acknowledge packet 107. This will be explained later in further detail.

The data of the receiving processor 120 holds the PERN 108 of the acknowledge packet 107 in the register 121. The comparator 126 compares the PERN 121 received with the local PEN 124. If they are not equal, the processor does nothing.

If they are equal, the instruction control 146 reads the CC 109 of the acknowledge packet 107 and control the execution thereof within the processor 110.

Figure 9:
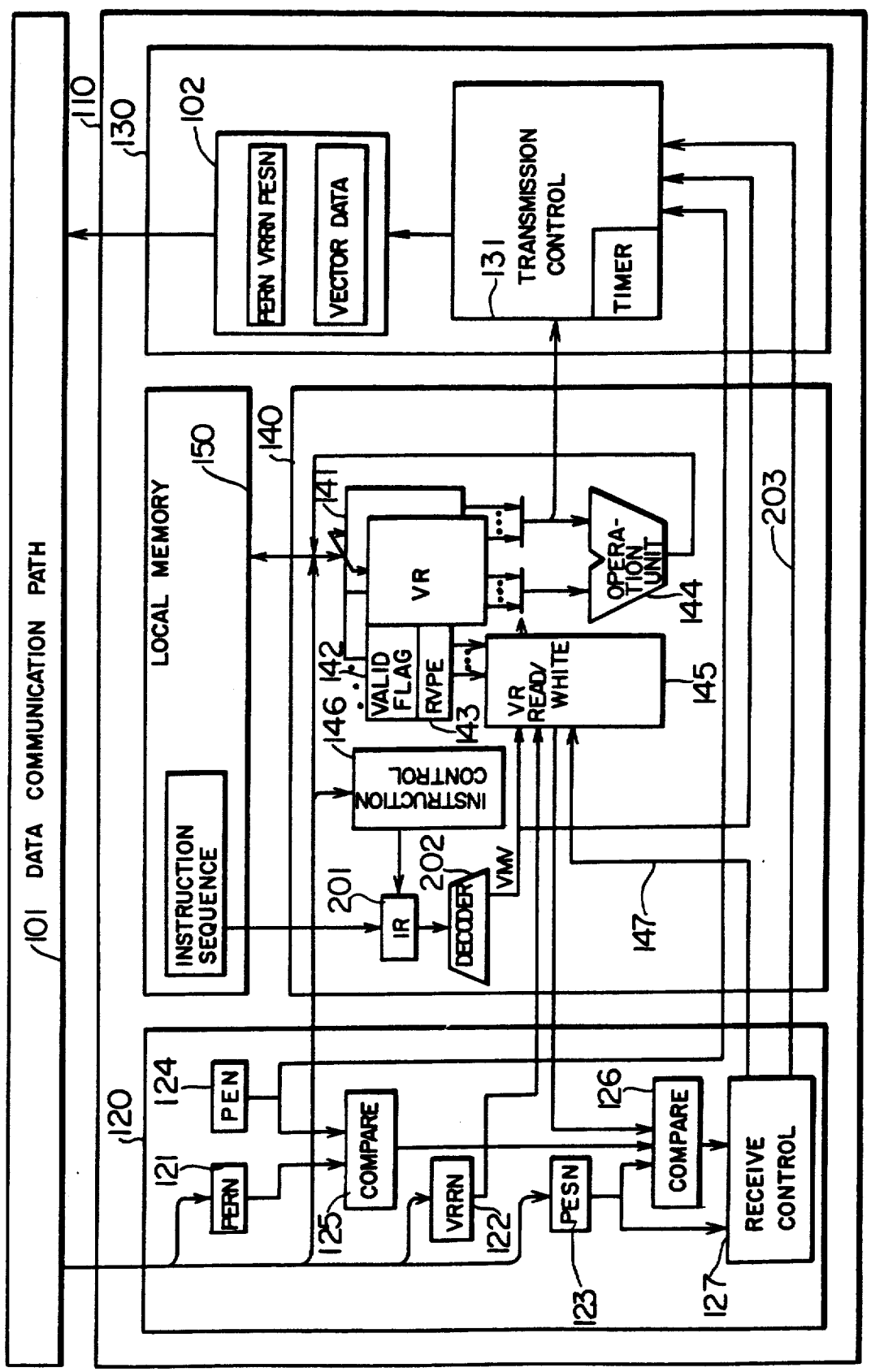
FIG. 9 illustrates transfer of vector data between processors.

The transmission/receipt of vector data is explained in detail with reference to FIG. 9, which shows the data communication path 101 and the processor 110 which transmits and receives the vector data.

The processor 110 fetches an instruction sequence from the local memory 150 and writes it into the instruction buffer 201. Instructions are sequentially fetched and decoded by the decoder 202. It is assumed below that a vector move (VMV) instruction to transmit vector data to other processor is decoded by the decoder 202.

The format of the VMV instruction is shown below. It is issued in tandem with a vector receive instruction which is issued only to a transfer-to processor.

| OP code | R1 | R2 | R3 |

In the above format, OP code indicates the VMV instruction, R1 indicates the receiving VR number (VRRN), R2 indicates the VR number in which the vector data to be transferred is held, and R3 indicates the receiving processor number (PERN). When the data processor 140 decodes the VMV instruction, it starts the transmission control 131 of the data transmitter 130. The thus started transmission control 131 receives from the data processor 140 the receiving processor number (PERN) found in the instruction, the receiving vector register number (VRRN) and the vector data to be transferred as designated by the VR number of the instruction. It also receives from the data receiver 120 the local processor number (PEN) 124 assigned to itself, generates a data packet 102 and sends it to the data communication path 101.

In the VMV instruction, the execution is not terminated by merely sending the data packet 102 to the data communication path 101 but it is necessary to check if the other processor, designated as the receiving processor, has accepted the data packet 102 and written it into the corresponding vector register without error. To this end, the data receiver 120 of the processor transmitting the vector data, must monitor the acknowledge packet 107 returned from the data transmitter 130 of the receiving processor.

A set of condition codes (CC) 109 of the acknowledge packet 107 sent from the receiving processor are defined as follows.

| | |
|---|---|
| CC = 0 | The data packet sent has been written into the designated VR without error. |
| CC = 1 | The valid flag 142 of the VR corresponding to the VRRN designated by the sent data packet is "1". |
| CC = 2 | The RVPE of the VR corresponding to the VRRN designated by the sent data packet and the PESN in the data packet do not match. |
| CC = 3 | There is no processor to receive the data packet sent. |

The condition code CC=3 is generated when the transmission control 131 of the transmitting processor has detected the lapse of a predetermined time period after the transmitting processor sends the data packet (time out error).

The data receiver 120 of the transmitting processor executing VMV instruction, monitors the acknowledgement packet 107. If the packet 107 is not the expected one, the data receiver 120 delivers the condition code CC 109 of the packet 107 to the instruction control 146. When the instruction control 146 receives the CC 109 it terminates the VMV instruction and starts the execution of the next instruction.

As described above, the comparator 125 compares the PERN 121 with the PEN 124, and if they are not equal the processor does nothing, and the CC is not generated.

If they are equal the comparator 126 checks if the valid flag 142 is "0" or "1" and compares the PESN 123 with the RVPE 143. The result of the comparator 126 is sent to the receive control 127 which, if the valid flag 142 is "0" and the PESN 123 and RVPE 143 are equal, generates the enable signal 147 to instruct the VR read/write control 145 of the data processor 140 to read the vector data 106 in the data packet 102 into the VR 141 designated by the VRRN 122. The receive control 127 generates CC=0 and combines it with the PESN 123 to generate a control signal 203 which instructs the transmission control 131 to generate an acknowledge packet.

When the VR read/write control 145 receives the enable signal 147, it reads the vector data 106 in the data packet 102 into the VR 141 corresponding to the VRRN 122. It sets the valid flag 142 of the VR 141 corresponding to the VRRN 122 to "1".

However, if the valid flag 142 is not "0" or the PESN 123 and the RVPE 143 are not equal, the receive control 127 does not write the vector data 106 into the corresponding VR 141, but rather generates the condition code CC=1 or CC=2 as designated by the VMV instruction, and combines it with the PESN 123 to generate the control signal 203 which instructs the data transmitter 130 to generate an acknowledge packet 107.

When the data transmitter 130 receives the control signal 203, it generates an acknowledge packet 107 based upon the PESN 123 and the condition code CC received from the data receiver 120 and sends it to the data communication path 101. The task of receiving the vector data is thus terminated.

If the processor 110 is waiting for the transfer of vector data from another processor to execute vector processing, the vector data 106 is written into the VR 141 thereof and the valid flag 142 is changed to "1". As a result the suspended vector processing is executed.

Figure 10:
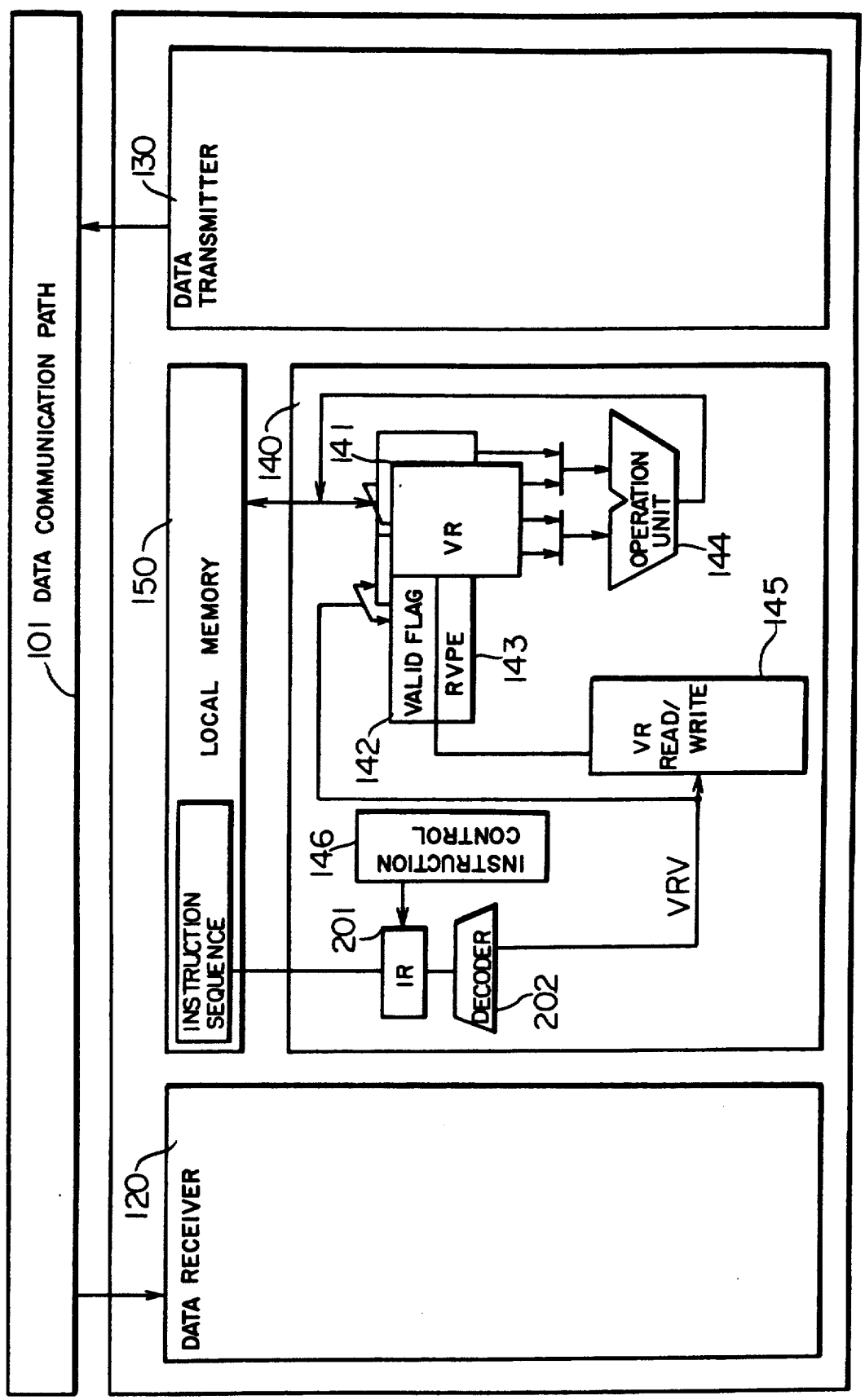
FIG. 10 illustrates synchronous transfer between processors.

Control for receiving vector data from another processor is explained with reference to FIG. 10. The control is based upon the valid flag 142 and the RVPE 143 added correspondingly to the VR 141 of the processor.

Since it is clearly known from what processor the vector data is transferred and when it is required for vector processing, the valid flag 142 along with the RVPE 143 added correspondingly to the VR 141 are capable of reflecting various conditions. To this end the vector receive (VRV) instruction is provided. The operation of the decoded VRV instruction is explained in detail with reference to FIG. 10.

The vector receive instruction has the following format:

| OP code | R2 | R3 |

In the above format, OP code indicates the vector receive VRV instruction, R2 indicates the VR number in which the vector data sent from another processor is to be stored, and R3 indicates the processor number from which the vector data is sent. When the data processor 140 decodes the VRV instruction it sets the valid flag 142 of the VR 141 corresponding to the VR number designated by the R2 field of the instruction to "0", and writes the processor number designated by the R3 field of the instruction into the RVPE 143 of the VR 141. The vector receive instruction is thus terminated and the VR 141 is now ready to receive the vector data from other processor.

Figure 11:
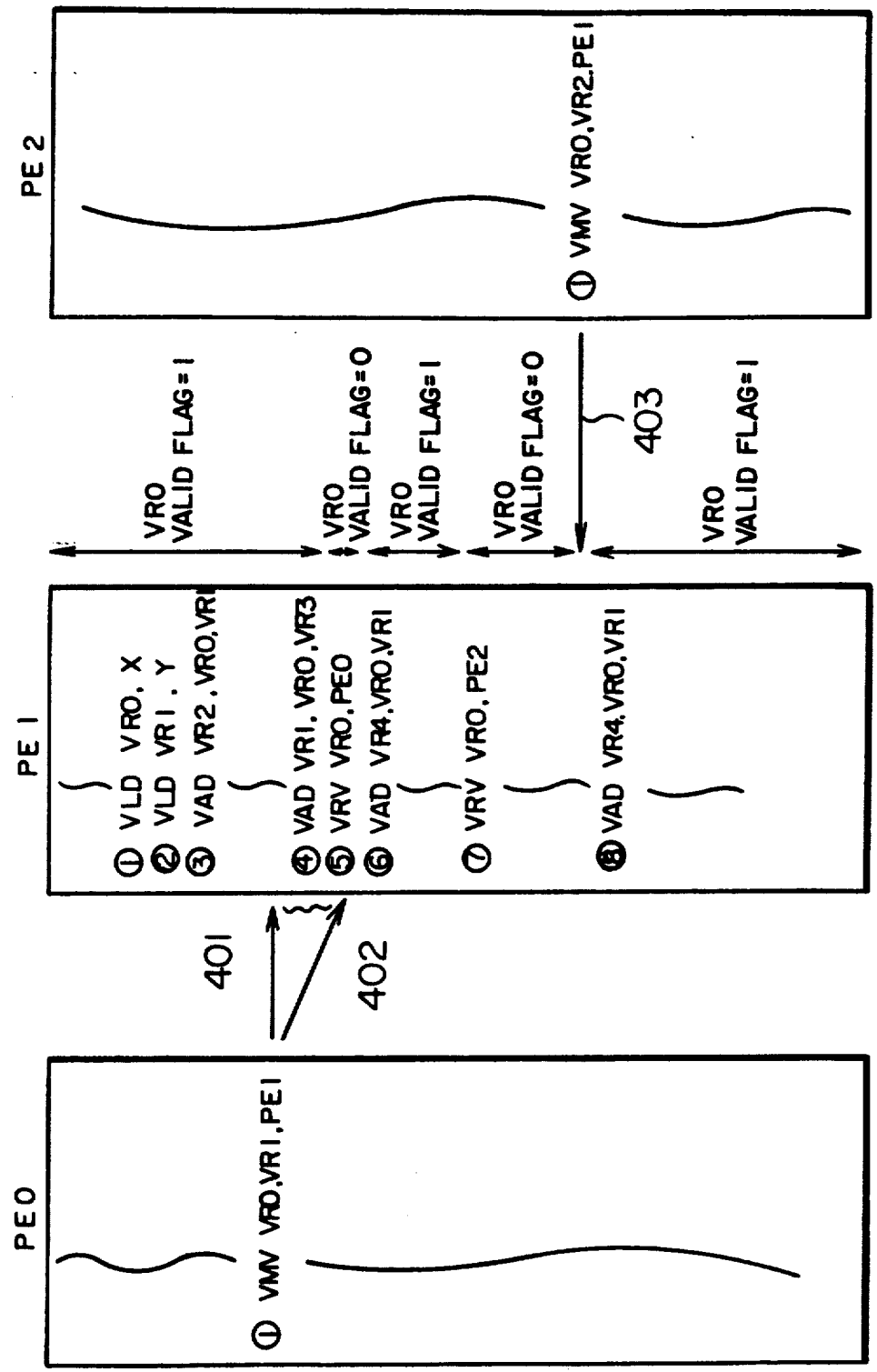
FIG. 11 illustrates transfer of vector data among three processors.

The transfer of vector data between processors is illustrated in FIG. 11. There, three processors are assigned the numbers PE0, PE1, PE2. In the illustrated process vector data is first transferred from the VR1 of the PE0 to the VR0 of the PE1, and then from the VR2 of the PE2 to the VR0 of the PE1.

It is assumed that the valid flag 142, of each VR 141, of each processor is set to "1" when the processor is powered on or reset.

In the processor PE1, the steps 1 to 4 are carried out within the PE1. VLD in the steps 1 and 2 represents a vector load instruction which writes the vector data of the local memory into the VR 141. The steps 3 and 4 are an addition between the VRs 141 in the PE1. In the step 5, the VRV instruction is executed to receive the vector data from the PE0 into the VR0.

On the other hand, in the process of the PE0, after various operations have been carried out, the VMV instruction is executed in the step 1 to transfer the vector data held in the VR1 of the PE0 to the VR0 of the PE1. However, at the time 401, since the valid flag of the VR0 of the PE1 is "1", CC=1. Thus, the vector data is not written into the VR0 of the PE1. As a result, the VMV instruction of the step 1 is repeatedly executed until the valid flag of the VR0 of the PE0 becomes "0" (CC=0). When the valid flag of the VR0 of the PE1 becomes "0", in the step 5 of the PE1, the vector data is transferred from the PE0 to the PE1 at the time 402. In step 6 of the PE1, the transfer of vector data and the operation between the vector registers are carried out in parallel.

In the transfer of vector data between the PE1 and the PE2, step 7 of the PE1 indicates the transfer of vector data from the PE2 to the VR0 of the PE1. Step 7 of the PE1 also indicates that the content of the VR0 of the PE1 is not subsequently used.

On the other hand, in the process of the PE2, after various operations have been carried out, the VMV instruction is executed in step 1 of the PE2 to transfer the vector data held in the VR2 of the PE2 to the VR0 of the PE1, at the time 403, since the valid flag of the VR0 of the PE1 is "0", the vector data can be written into the VR0 of the PE1 and the VMV instruction in step 1 of the PE2 terminates CC=0. Then, the process of the PE2 carries out the steps after step 1.

In step 8 of the PE1, a vector add (VAD) instruction can be executed without waiting for the transfer of the vector data. By using the data communication path and providing the valid flag in the VR of the processor and a register for holding the transmitting processor number, the order of the transfer of vector data between the processors is assured and high speed transfer of vector data between the processors is attained.

Figure 12:
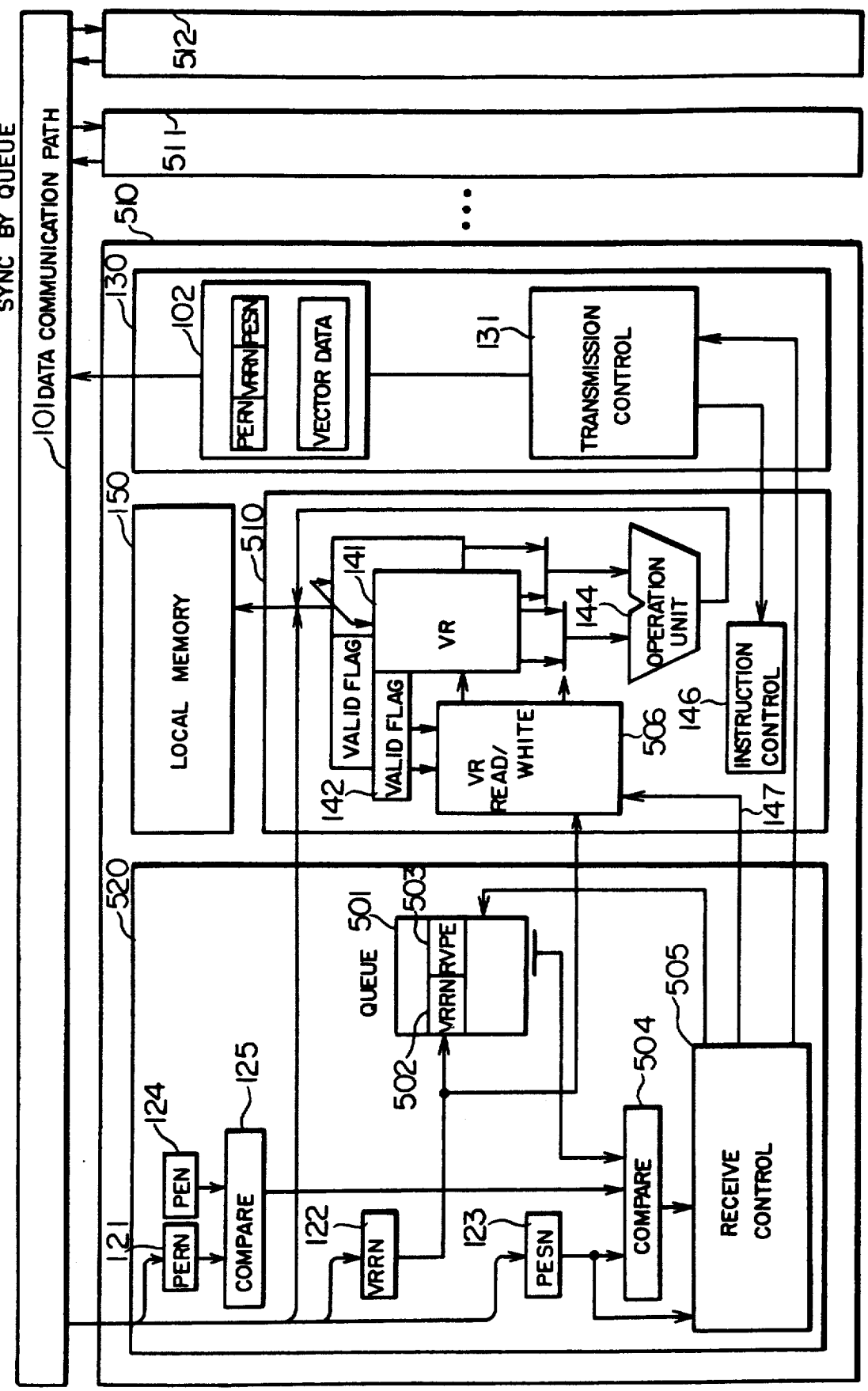
FIG. 12 shows an overall configuration of an embodiment having a queue, which is an improvement over the embodiment of FIG. 8; and, FIG. 13 shows an overall configuration of one embodiment of the present invention in which a receive buffer has been added to the embodiment of FIG. 8.

In the present invention, the valid flag, which indicates whether the content held in the VR is valid (not to be overwritten), and the register RVPE, for holding the transmitting processor number when the vector data is sent from another processor, are provided for each VR. Alternatively, in another embodiment, a queue may be used. In FIG. 12, the data receiver 520 of each of the processors 510 to 512 has a queue 501 which holds the VR number (VRRN) 502 in which the vector data sent from another processor is to be written and the processor number (RVPE) 503 from which the vector data is sent. As the VRV instruction shown in FIG. 10 is executed, the content of the queue 501 is updated and the valid flag of the VR designated by the instruction is set to "0".

Figure 8:
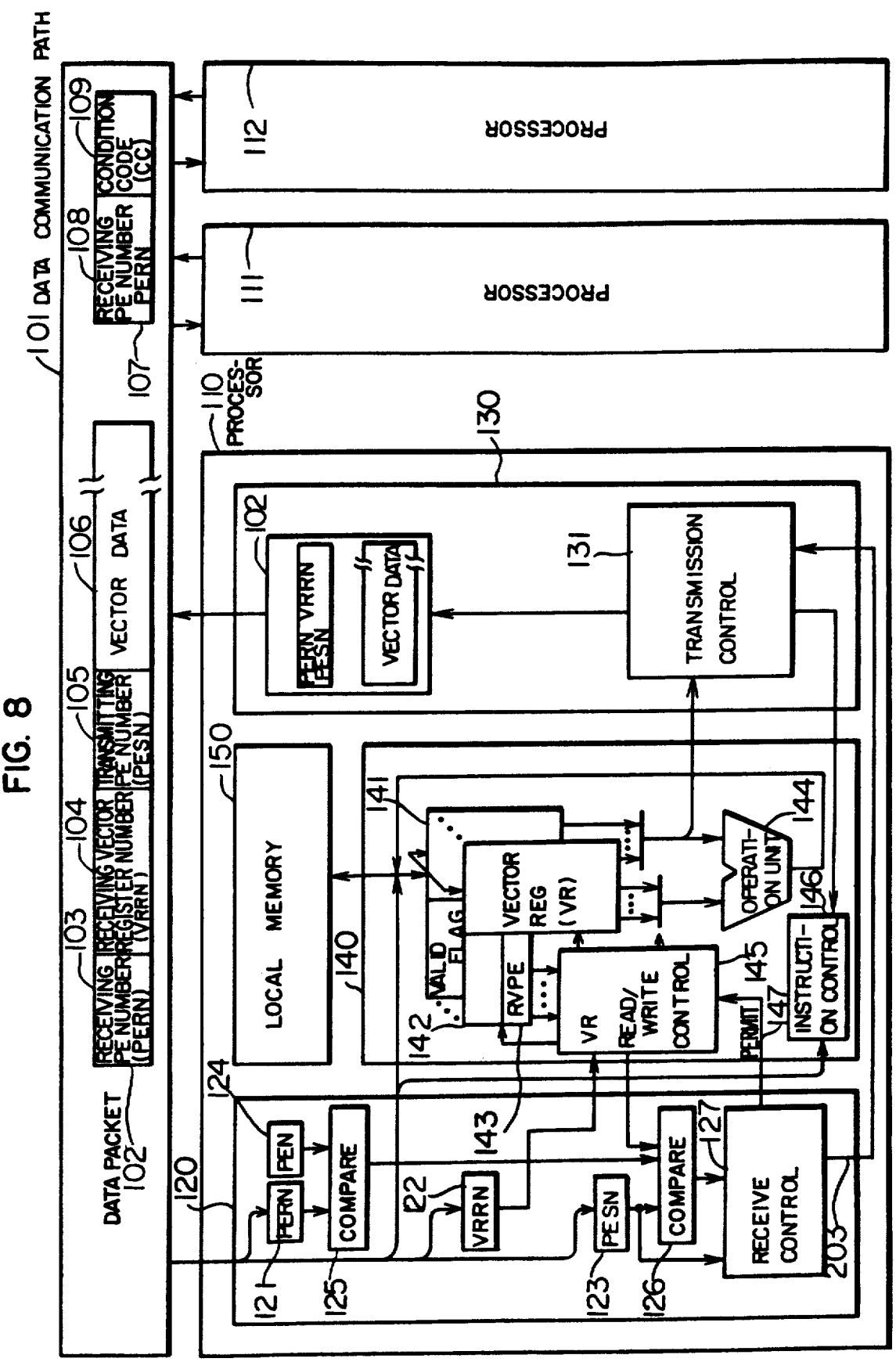
FIG. 8 shows an overall configuration of an embodiment of the present invention.

When the data packet 102 is sent from another processor executing the VMV instruction, the data receiver 520 compares the PERN 121 of the data packet 102 with the PEN 124 using the comparator 124, as in the embodiment represented by FIG. 8. If they are not equal the processor does nothing. If they are equal the data receiver 520 searches the VRRN 502 in the queue 501 which has the same content as that held in the VRRN 122. If there is no corresponding VRRN 502 in the queue 501, condition code CC=1 is sent to the transmitting processor as in the embodiment represented by FIG. 1.

If there is a corresponding VRRN 502 in the queue 501, the corresponding RVPE 503 is read and it is compared with the PESN 123 by the comparator 504. If they are not equal, the data receiver 520 waits for other data and condition code CC=2 is sent to the transmitting processor as in the embodiment represented by FIG. 1.

If the RVPE 503 is equal to the PESN 123, the receive control 505 generates an enable signal 147 to instruct the VR read/write control 506 to write the vector data 106 in the data packet 102 into the VR 141 designated by the VRRN 122.

The receive control 505 deletes the VRRN 502 and the RVPE 503 from the queue 501 corresponding to the VRRN 122.

The VR read/write control 506 writes the vector data into the corresponding VR 141 and sets the valid flag to "1" upon receiving the enable signal 147 as in the embodiment represented by FIG. 8.

By providing a valid flag for each VR, providing the queue 501, which may have a plurality of VRRN 502 and RVPE 503 in the data receiver 520, and searching the queue 501 by the VRRN 104 in the data packet 102 to determine whether the vector data is to be received of not, high speed vector data transfer between the processors is attained.

In FIG. 11, it is necessary to repeatedly execute the VMV instruction in step 1 of the PE0 until the valid flag of the VR0 of the PE1 becomes "0".

Figure 13:
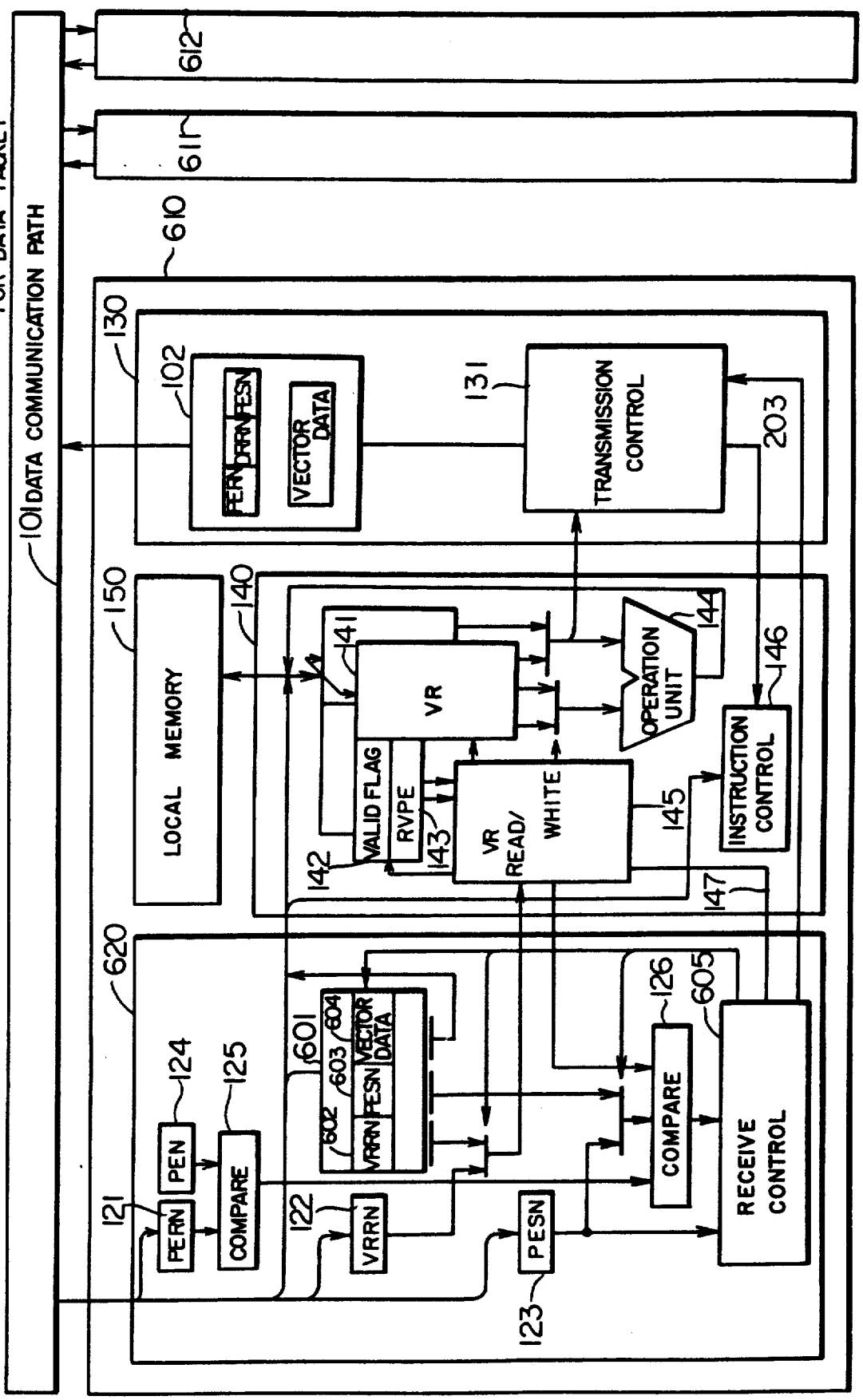

As shown in FIG. 13, a receive buffer 601, which can hold at least one data packet 102, is provided in the data receiver 620 of each of the processors 610 to 612. When a data packet 102 is sent from another processor executing the VMV instruction, the data receiver 620 holds the PERN 103, VRRN 104, and PESN 105 of the data packet 102 in the registers 121 to 123, respectively, as in the embodiment represented by FIG. 8. The comparator 125 compares the PERN 121 with the PEN 124. If they are not equal the processor 610 does nothing, and the condition code CC is not generated.

If they are equal the data receiver 620 reads the valid flag 142 and the RVPE 143 added to the VR 141 designated by the VRRN 122 and compares them using the comparator 126, as in the embodiment represented by FIG. 8.

If the valid flag 142 is "0" and the PESN 123 and the RVPE 143 are equal, the receive controller 605 generates an enable signal 147 to instruct the VR read/write control 145 of the data processor 140 to write the vector data 106 in the data packet 102 into the VR 141 designated by the VRRN 122 of the data packet 102.

The receive control 605 requests the data transmitter 130 to generate an acknowledge packet 107. When the VR read/write control 145 receives the enable signal 147, it writes the vector data 106 of the data packet 102 into the VR 141 corresponding to the VRRN 122, and sets the valid flag 142 of the VRRN 141 from "0" to "1".

However, if the valid flag 142 is "0" or the PESN 123 and the RVPE 143 are equal, the receive control 605 writes the VRRN 104, the PESN 105, and the vector data 106 of the data packet 102 into the receive buffer 601. Then, the receive control 601 generates CC=0 and requests the data transmitter 130 to generate the data packet 107.

There is a limit to the capacity of the receive buffer 601. If the receive buffer 601 is full and cannot receive another data packet 102, the data packet 107, having condition code CC=1 or CC=2, is sent as in the embodiment represented by FIG. 8. From the data packet written into the receive buffer 601, the receive control 605 reads the valid flag 142 and the RVPE 143 of the corresponding VR 141 unless a new data packet 102 is sent from the data communication path 101.

The receive control 605 reads the valid flag 142 and the RVPE 143 of the VR 141 corresponding to the VRRN 602 written into the receive buffer 601, and checks with comparator 126 whether the PESN 603 in the receive buffer 601 and the RVPE 143 are equal or not, and whether the valid flag 142 is "0" or not, as in the embodiment represented by FIG. 8.

If the conditions are met, the receive control 605 sends an enable signal 147 to the VR read/write control 145, which reads the vector data 604 from the receive buffer 601 and writes it into the corresponding VR 141. When the writing of the VR 141 is complete, the receive control 605 releases the release buffer 601 which has held the data packet, to allow the transfer for the next vector data.

If the conditions are not met by the comparison of the comparator 126, a plurality of receive buffers 601 may be provided, and if the data packet has been received by the receive buffer 601, the comparison is executed for the next receive buffer 601. If only one receive buffer 601 is provided, the valid flag 142 and the RVPE 143 of the VR 141, designated by the receive buffer 601, are continuously monitored.

If there are a plurality of receive buffers 601, the order of writing of VRs becomes critical. For example, when the transfer of a plurality of vector data from one processor is requested to one VR, and the vector data cannot be written into that VR, and the receive buffer holds the data packets having the equal VRRN 104 and the PESN 105, then one arbitrary data packet in the receive buffer is written into the corresponding VR. As a result, the final results of the processing is unpredictable.

To avoid the above problem, one receive buffer is provided for each VR or the receive buffer is controlled to hold only one data packet at one time having equal VRRN 104 and PESNs 105. If the VRRN and the PESN are equal in the content of the receive buffer and the content of the data packet transferred from the data transmission path, the content of the receive buffer is written into the VR first.

By controlling the receive buffer in this manner, the order of writing of the VRs is guaranteed.

By providing one or more receive buffers 601 for holding the data packets in the data receiver 620, the number of repetitive executions of the VMV instruction shown in FIG. 11 is reduced and the overall performance of the parallel processor is improved.

We claim:

1. A parallel processor system having a plurality of processors and a data communication path connected to said processors for transmitting data between said processors, each of said processors comprising:
   (a) a memory for storing data and for storing instructions, the data including a plurality of vector data each comprising a set of vector elements, and the instructions comprising vector instructions;
   (b) a plurality of vector registers connected to said memory, each vector register storing vector data, receiving vector data from said memory and providing vector data to said memory;
   (c) operation means, connected to said vector registers, for performing an operation on vector data read from one of the vector registers, and for providing vector data obtained as a result of the operation to one of the vector registers;
   (d) a data receiver connected to said data communication path for receiving vector data from said data communication path, the vector data being transmitted by another processor;
   (e) a data transmitter connected to said data communication path for transmitting vector data to be processed by another processor to said data communications path; and,
   (f) control means, connected to said memory, said vector registers, said data transmitter, and said data receiver, for controlling vector data reading from and vector data writing into said vector registers, said control means including execution means, responsive to a vector instruction of a first kind, fetched from said memory for reading first vector data from a first register of said vector registers designated by the vector instruction and for providing the first vector data to said data transmitter to be transmitted thereby, and the execution means further being responsive to a vector instruction of a second kind, fetched from said memory for writing into a second register of said vector registers designated by the vector instruction, second vector data received by said data receiver.

2. The parallel processor system according to claim 1 wherein each of said processors includes means, connected to said data transmitter and said control means, and responsive to the vector instruction of the first kind, for providing said data transmitter with a destination vector register number together with said first vector data, the destination vector register number indicating one vector register into which the first vector data is to be written, among the vector registers provided in a destination processor to which the first vector data is to be transmitted;
   wherein said data transmitter includes means for transmitting both the first vector data and the destination vector register number to the destination processor via the communication path; and
   a detecting means, connected to said data receiver, for detecting coincidence between received destination vector register numbers received by said data receiver together with received vector data and a number of the second vector register and when coincidence is detected for writing the one received vector data into the second vector register.

3. The parallel processor system according to claim 2, wherein said detecting means includes:
   means responsive to the vector instruction of the second kind for indicating that the second vector register has been designated as a receive vector register; and
   means responsive to receipt of the one vector data and the destination vector register number after execution of the vector instruction of the second kind for detecting coincidence between the received vector register number and a number of a vector register as designated as a receive vector register.

4. The parallel processor system according to claim 1 wherein each of said processors includes discrimination means connected to said vector registers for selecting data which are to be written as vector elements of the second vector data from received plural data and for supplying the selected data to said second vector register.

5. The parallel processor system according to claim 4 wherein each of said processors includes means connected to said data transmitter and responsive to the vector instruction of the first for supplying identifiers for each vector element of the first vector data, combination means for combining the vector elements and said identifiers into a data packet, and means for sending the data packet to said communication path.

6. A parallel processor system comprising:
   (a) a plurality of processors; and
   (b) a data communication path connected to said processors for transferring data from a first processor to a second processor, the second processor being designated by the first processor, each of said processors including:
   (i) a memory for storing data and instructions, the data including a plurality of vector data each thereof comprising a set of vector elements and the instructions comprising vector instructions;
   (ii) a plurality of vector registers connected to said memory, for receiving vector data therefrom and for providing vector data thereto, each vector register holding vector data;

(iii) operation means, connected to said vector registers, for performing an operation on vector data read from one of the vector registers and for providing vector data obtained as a result of the operation to another of the vector registers;

(iv) a data receiver connected to said data communication path for sequentially receiving vector elements of vector data transmitted by another processor from said data communication path; and (v) a data transmitter connected to said data communication path for sequentially transmitting vector elements of vector data to be processed by another processor to said data communication path, (vi) control means, connected to said memory, said vector registers, said data transmitter, and said data receiver, for controlling vector data reading from and vector data writing into said vector registers, said control means including execution means, responsive to a vector instruction of a first kind, fetched from said memory for reading first vector data from a first register of said vector registers designated by the vector instruction and for providing the first vector data to said data transmitter to be transmitted thereby, and the execution means further responsive to a vector instruction of a second kind, fetched from said memory for writing into a second register of said vector registers designated by the vector instruction, second vector data received by said data receiver, said control means including data identification means responsive to the vector instruction for generating a first sequence of data identifiers respectively predetermined for respective elements of the first vector data read out of the first vector register and responsive to the vector instruction of the second kind for generating a second sequence of data identifiers respectively predetermined for vector elements of the second vector data written into said second vector register;

wherein said data transmitter includes means for sequentially transmitting pairs each of one of the data identifiers of the first sequence and a corresponding vector element of the first vector data; and, wherein said control means includes means responsive to the data identifiers of the second sequence for sequentially writing into the second vector register a set of vector elements corresponding to the data identifiers of the second sequence, among pairs each of a data identifier and a vector element, received by said data receiver.

7. The parallel processor system according to claim 6 wherein said data identification means includes an identifier generation control circuit for generating a sequence of data identifiers for vector elements of a vector data so that each of the data identifiers comprises a first part which is the same for the vector elements and a second part which is dependent upon a sequential element number of a corresponding vector element.

8. The parallel processor according to claim 6 wherein said control means includes means for delaying writing of vector elements corresponding to succeeding ones of the data identifiers of the second sequence when one vector element corresponding to a preceding one of the data identifiers of the second sequence is not yet received by said data receiver.

9. The parallel processor according to claim 6 wherein said data identification means comprises means for reading out data identifiers held by a third vector register designated by one of the vector instructions of the first kind and the vector instruction of the second kind as one sequence of the first and second sequences of the data identifiers.

10. A parallel processor system having a plurality of processor elements and a data communication path connected to said processor element for transmitting data between any two of the processor elements provided by one of said processors to another one of said processors designated by the one processor, each of said processor elements comprising:

(a) a memory for storing data and instructions, the data including plural data each thereof comprising a set of vector elements and the instructions comprising vector instructions;

(b) a plurality of vector registers connected to said memory, (c) operation means connected to said vector registers for performing an operation on vector data read out of one of the vector registers and for providing vector data obtained as a result of the operation to one of the vector registers;

(d) a data receiver connected to said data communication path for receiving vector data transmitted by another processor from said data communication path;

(e) a data transmitter connected to said data communication path for transmitting vector data to be processed by another processor to said data communications path; and, (f) control means connected to said vector registers, said data transmitter and said data receiver for controlling reading vector data from and writing vector data into said vector registers, said control means including means responsive to a vector instruction of a first kind fetched from said memory for reading first vector data from a first one of said vector registers designated by the vector instruction of the first kind and for providing the first vector data to said data transmitter so as to be transmitted thereby and responsive to a vector instruction of a second kind fetched from said memory for writing into a second one of said vector registers designated by the vector instruction, second vector data received by said vector data receiver;

wherein said data transmitter includes means for transmitting a first processor number assigned to the processor and a first vector register number designated by the vector instruction of the first kind, together with the first vector data, the first vector register number being assigned to one vector register which should receive the first data, among vector registers provided within another processor to which the first vector data is sent;

wherein said control means includes processor number holding means responsive to one vector instruction of the second kind for holding a second processor number designated by the one instruction of the second kind, as a processor number for a processor which is allowed to send vector data to a vector register designated by the one vector instruction of the second kind;

means connected to said data receiver for writing vector data received by said data receiver, into one of the vector registers assigned with a vector register number received together with the vector data received by said data receiver, when a processor number is already held for the one vector register by said processor number holding means and coincides with a processor number received together with the vector data.

11. The parallel processor system according to claim 10 wherein said data transmitter includes means for transmitting a response data to one processor assigned with the received processor number when any processor number is not held for the one vector register yet or when a processor number is held for the one vector register but does not coincide with the received processor number, the response data requesting said one processor to re-transmit the vector data.

12. The parallel processor system according to claim 8 wherein said control means further includes memory means for temporary holding plural sets each comprising vector data received by said data receiver but not written by said writing means, a vector register number and a processor number both received with the vector data;

means connected to said memory means and said holding means for detecting whether or not said processor number holding means holds a processor number coincident with one included in one of the sets for one vector register assigned with one vector register number included in the one set and for writing vector data included in the one set into the one vector register in response to detecting of said processor number holding means holding the coincident processor number.

* * * * *

UNITED STATES PATENT AND TRADEMARK OFFICE
CERTIFICATE OF CORRECTION

PATENT NO. : 5,010,477
DATED : April 23, 1991
INVENTOR(S) : Koichiro Omoda, et al.

It is certified that error appears in the above-identified patent and that said Letters Patent is hereby corrected as shown below:

ON TITLE PAGE:
The title should read as follows:

PARALLEL PROCESSING SYSTEM WITH REGISTERS & LOGIC FOR INTER-PROCESSOR DATA COMMUNICATIONS INDEPENDENT OF PROCESSING OPERATIONS

Claim 5, column 16, line 49, after "first" please insert --kind--.

Claim 10, column 18, line 13, after "plural" please insert --vector--.

Claim 10, column 18, lines 14-15, delete "comprising" and insert therefor --including--.

Signed and Sealed this

First Day of September, 1992

Attest:

DOUGLAS B. COMER

*Attesting Officer*     Acting Commissioner of Patents and Trademarks